United States Patent [19]

Matyja et al.

[11] Patent Number: 4,466,473

[45] Date of Patent: Aug. 21, 1984

[54] TIRE PLY SPLICE CONSTRUCTION AND METHOD OF MAKING THE SAME

[75] Inventors: Frank E. Matyja, Akron; Edward C. Sebak, Uniontown, both of Ohio

[73] Assignee: The General Tire & Rubber Company, Akron, Ohio

[21] Appl. No.: 468,432

[22] Filed: Feb. 22, 1983

[51] Int. Cl.³ .................................................. B60C 9/04
[52] U.S. Cl. .................................. 152/354 R; 156/134
[58] Field of Search ............. 152/354 R, 354 RB, 355, 152/356 R, 356 A, 357 R, 357 A, 358, 359, 360; 156/110.1, 122, 123, 128.1, 133, 134, 304.1, 304.2, 304.3, 304.5

[56] References Cited

U.S. PATENT DOCUMENTS

| | | | |
|---|---|---|---|
| 1,043,143 | 11/1912 | Raymond | 152/360 |
| 1,229,175 | 6/1917 | Christopherson | 156/122 |
| 1,350,995 | 8/1920 | Grabau | 152/354 R |
| 2,675,854 | 4/1954 | Engler | 156/122 |
| 3,689,341 | 9/1972 | Ninomiya | 156/304.5 |
| 3,719,218 | 3/1973 | Leybourne | 152/361 R |
| 3,841,376 | 10/1974 | Paulin et al. | 152/361 R |
| 4,325,423 | 4/1982 | Seitz et al. | 156/134 |

FOREIGN PATENT DOCUMENTS

| | | | |
|---|---|---|---|
| 1269753 | 7/1961 | France | 156/304.5 |
| 25172 | of 1913 | United Kingdom | 152/354 |

Primary Examiner—Edward C. Kimlin
Assistant Examiner—F. K. Wine

[57] ABSTRACT

A method of making radial pneumatic tires substantially reduces or eliminates sidewall indentations in the inflated tire. A plurality of cuts is made in one end of each layer of ply fabric where the end of the ply fabric overlaps the other end to form a splice which results in the generally annular shape of the ply layer. The cuts extend in a direction generally transverse to the end edge and preferably have a length which is approximately the same as the width of the overlap of the cut edge with the other edge. The cuts prevent overtensioning of the ply cords, which otherwise result in sidewall indentations.

8 Claims, 4 Drawing Figures

TIRE PLY SPLICE CONSTRUCTION AND METHOD OF MAKING THE SAME

BACKGROUND OF THE INVENTION

1. Field of the Invention

This invention relates to radial tire building and, more particularly, to an improved method of splicing one end of the radial ply fabric layer to the other end to form an annular layer of ply stock.

2. Description of the Prior Art

In the construction of radial ply tires, a carcass consisting of one or more plies of elastomericized fabric is built upon a generally cylindrical drum by applying layers of fabric with cords running perpendicular to or in a near perpendicular direction to the edge of the fabric layer. The ply fabric is applied so that the cords run from bead to bead in a direction which is generally parallel to the axis of the drum. Thereafter, the layers of fabric plies are secured by turning the side edges of the plies around a coil of bead wire enclosed in suitable reinforcing and packing strips. The carcass is then shaped to the required toroidal form, after which breaker and tread portions are applied to the crown portion of the carcass. Then, the tire is placed in a suitable mold and is cured.

As each layer of ply stock is wrapped around the carcass, a splice is formed between the ends of the layers in order for the ply layer to achieve an annular shape. This splice is formed in a direction generally parallel to the direction of the cords in the fabric, i.e., in the direction generally parallel to the axis of the drum. To keep the ply splice from opening up or slipping open during assembly, one end of the ply fabric typically overlaps the other end a short distance. This overlapping, or lap splicing, is the traditional and accepted method of placing fabric plies on a tire carcass. The overlap is usually confined to a short distance, and usually only involves a few ply cords. The distance of a typical overlap may be approximately 0.07 to 0.5 inch.

The resulting overlapping splice results in an area of the tire in which the ply reinforcement is increased. Since the double layer of cords in the overlapping splice area exhibit a different tension from the remaining single layer of the carcass cords, there is less cord elongation in the sidewall in the area of the splice. This results in sidewall indentations in the inflated tire.

In an effort to eliminate these indentations, a reinforced butt splice has been developed. This splice involves having the ends of the ply layer abut each other so that no overlapping occurs, and reinforcing the splice with a strip of another material. The reinforcing strip may be, for example, a gum strip made of nylon or a woven material. A major disadvantage of this reinforced butt splice is that it introduces an additional material into the tire, and the interaction of this material with the existing tire material may produce detrimental results. In addition, the reinforcement adds to the weight of the tire and increases material costs.

SUMMARY OF THE INVENTION

The present invention provides a method for splicing radial fabric plies which overcomes the disadvantages of the prior art and provides other advantages which have not been achieved heretofore.

In accordance with the present invention, one end of each fabric ply layer is cut a plurality of times in a direction generally transverse to the splice, and the ends are overlapped so that one of the overlapping ends is provided with a plurality of cuts. The cords on one of the overlapped layers are thus cut into a number of discrete lengths. Since the cut cords have minimal tension during inflation, the elongation differential is minimized and sidewall indentations are eliminated or substantially reduced.

The present invention avoids the necessity of introducing an additional material into the tire, as was necessary for reinforced butt splicing. In addition, the transverse cuts in one end of the overlapping ply layer avoid the problems of sidewall indentations associated with conventional lap splicing.

These and other advantages are achieved by the present invention of a method of making pneumatic tires. In the method, a layer of ply stock is placed on a tire carcass, with the sides of the ply layer extending outwardly toward the area of bead placement. A plurality of cuts is made in one end edge of the ply layer in a direction generally transverse to the end edge. The cut edge is overlapped with the other edge of the ply layer to form an annular layer of ply stock on the carcass. Thereafter, the construction of the tire is completed in accordance with conventional methods. The steps of the method may be repeated for additional layers of ply stock.

Preferably, the length of the cuts is approximately the same as the width of the overlap of the cut end with the other end. The method of the present invention is especially adapted to the construction of radial tires, in which the ply layer is placed on the carcass with cords extending from side to side.

The method of the present invention provides a pneumatic tire which comprises a tread portion extending circumferentially around the tire. Two annular bead portions are provided which have beads embedded therein. A pair of flexible sidewall portions are provided along the sides of the tire. Each sidewall portion connects one side of the tread portion with the associated bead portion. A plurality of layers of carcass plies extends through the sidewall portions. Each ply layer is folded around the beads so that the side portions of the plies are located in the sidewall portions. The ends of the plies are spliced together to form a generally annular shape. One end of each ply layer of the splice has a plurality of cuts extending transversely to the splice to form a generally serrated edge.

BRIEF DESCRIPTION OF THE DRAWINGS

In the drawings, which are not drawn to scale.

DESCRIPTION OF THE PREFERRED EMBODIMENTS

Figure 1:
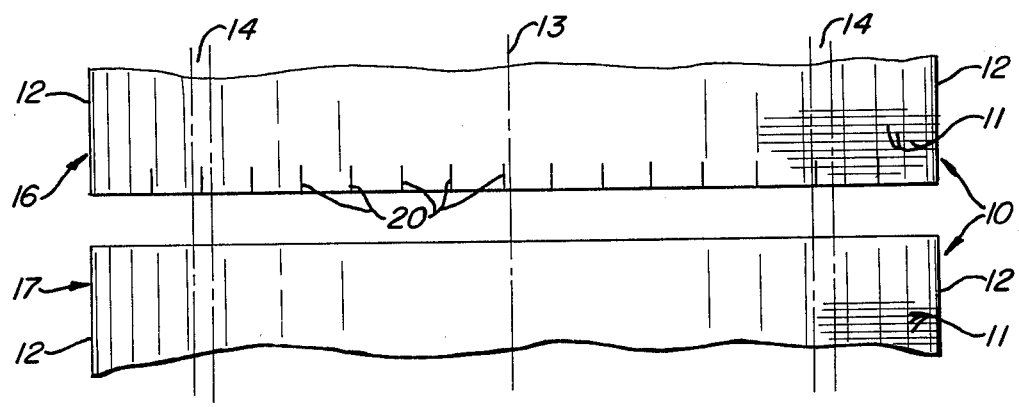
FIG. 1 is an elevational view of the two ends of a ply layer prior to splicing the ply layer ends together to form an annular shape.
Figure 2:
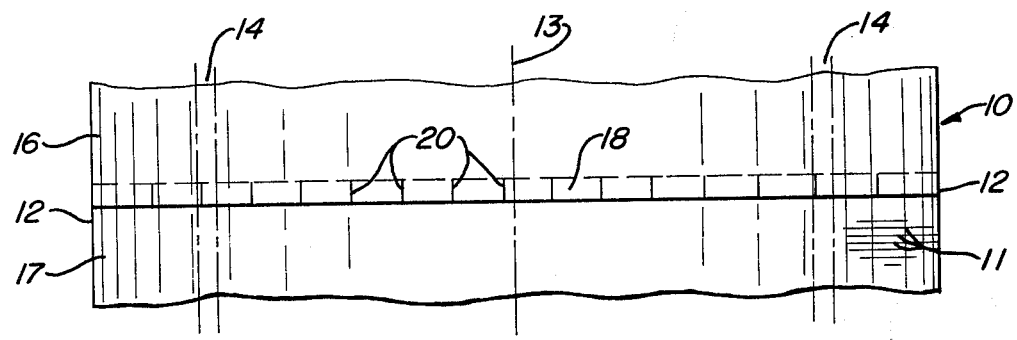
FIG. 2 is an elevational view similar to FIG. 1, with the ends of the ply layer in place and spliced together.

Referring more particularly to the drawings, and initially to FIGS. 1 and 2, there is shown a layer 10 of carcass ply fabric. The ply layer 10 may be of any conventional fabric used in the construction of radial tires, such as steel or polyester. The ply layer 10 comprises cords 11 running between the sides 12 of the layer. The ply layer 10 is centered on the centerline 13 of a tire carcass on a conventional building drum. The sides of the ply layer 10 extend outwardly from the centerline 13 beyond the areas 14 of bead placement to the outer edge of the drum.

When the ply layer 10 is wrapped around the building drum, the two ends 16 and 17 of the ply layer adjoin each other as the ply layer forms an annular shape. In accordance with conventional methods, the two ply ends 16 and 17 are overlapped in a small area 18 to form a conventional lap splice. The overlapping of the material in the area 18 is necessary to keep the ply splice from opening up or slipping open during assembly. However, the double ply layer at the splice results in a different tension from that provided by the single layer of other cords in the ply layer. As a result, there is less cord elongation in the sidewall in the area of the splice, and sidewall indentations are formed in the inflated tire.

In accordance with the present invention, a plurality of cuts 20 is formed in one end 16 of the ply layer 10. The cuts 20 extend generally transversely to the end edge of the ply layer 10 and generally parallel to the bead placement areas 14 and to the centerline 13.

When the ends 16 and 17 of the ply layer are overlapped to form a splice, as shown in FIG. 2, one end 16 is provided with the cuts 20 extending inwardly from the end edge at a distance approximately the same as the amount of the overlap. As a result, the cut cords in the end and have minimal tension during inflation, and help to minimize the elongation differential between the cords at the splice and the other cords in the ply layer 10. This helps to reduce or eliminate sidewall indentations in the inflated tire.

Figure 3:
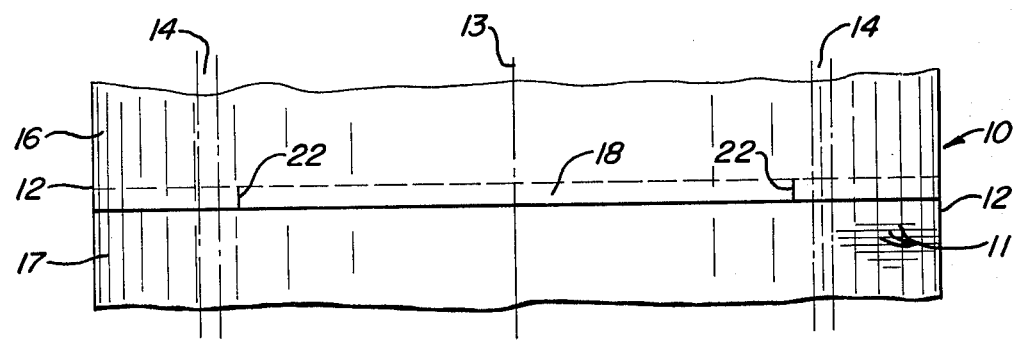
FIG. 3 is an elevational view similar to FIG. 2, showing another embodiment of the present invention.

The length and number of cuts can vary with tire size, design, and type of fabric. As shown in FIGS. 1, 2 and 3, the length of each cut 20 is such that approximately four cords 11 in the ply end 16 are cut, and the width of the overlap area 18 shown in FIG. 2 is also approximately equal to four cords. Preferably, the length of each of the cuts 20 is approximately the same as the width of the overlap of the cut end 16 with the other end 17. The width of a conventional ply overlap area 18 may be approximately 0.15 inch to 0.5 inch, with a width of 0.2 inch being typical. Accordingly, the cuts 20 can be anywhere from about 0.15 inch to about 0.5 inch in length, and are typically about 0.2 inch.

Additional ply layers are spliced in the same manner with one end of the ply layer cut and the cut end overlapping the uncut end.

After all of the ply layers are formed, the construction of the tire is completed in accordance with the conventional practice. The beads are placed in the areas 14 on each side of the tire carcass over the ply layers. The ply layers are then wrapped around the beads in the conventional manner. The tire carcass is expanded to a toroidal shape, and breaker and tread portions are applied circumferentially around the carcass. The tire is then placed in a suitable mold and cured.

While it is preferred to provide cuts 20 along the entire end edge of the ply layer, as shown in FIGS. 1 and 2, it is also possible to achieve the advantages of the present invention by providing cuts only in the areas of bead placement. For example, a pair of single cuts 22 may be made in one end 16 of the ply layer 10 directly inwardly of the bead placement areas 14, as shown in FIG. 3. These cuts 22 would reduce cord tension in the overlapping ply layer by preventing the cords in the sidewall from being connected to the cords which are wrapped around the bead. Since the ply cords in the sidewall in the area of the overlap are thus less rigidly connected to the bead, the cord elongation in this splice area substantially matches that in the other areas, and sidewall indentations are prevented.

Figure 4:
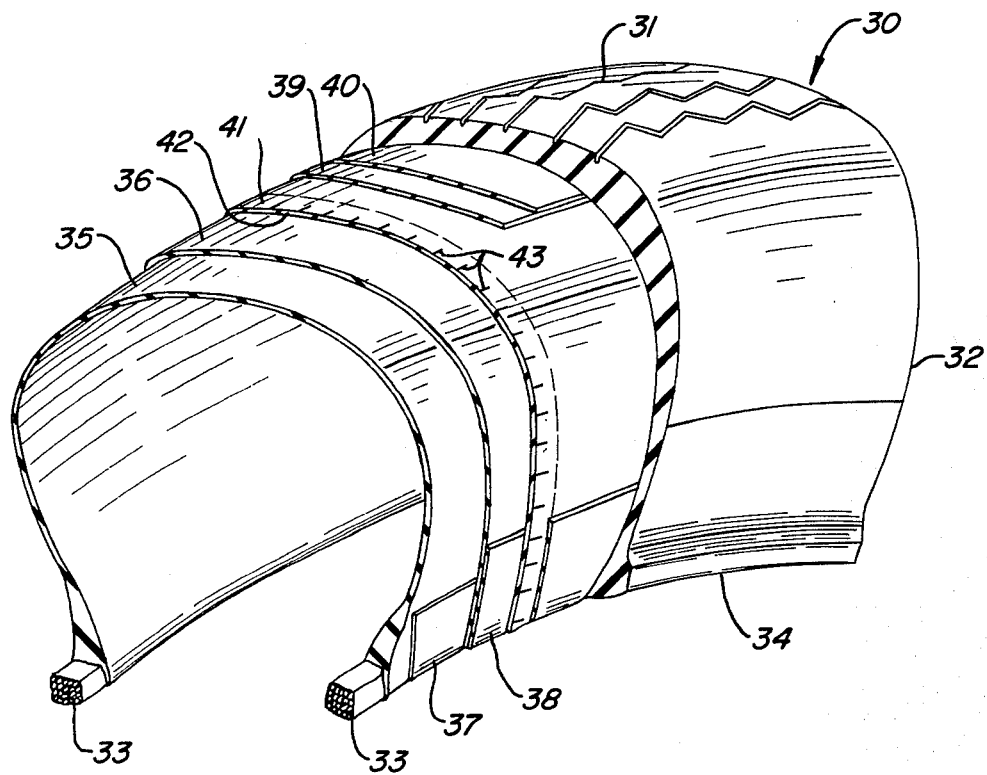
FIG. 4 is a perspective view of a portion of a pneumatic tire formed in accordance with the method of the present invention.

In FIG. 4, there is shown a finished pneumatic tire 30 made using the splice shown in FIGS. 1 and 2. The tire 30 has a thick tread portion 31 which extends circumferentially around the tire and sidewalls 32 which extend from the tread portion 31 along the sides of the tire. The tire 30 is designed to be mounted on a conventional wheel rim, and wire beads 33 are provided in the bead portion 34 of the tire where the sidewall meets the rim. The tire 30 has two carcass plies 35 and 36 extending around the interior of the tire. The plies extend from bead to bead and are folded around the beads 33 so that the sides 37 and 38 of the plies are located in the sidewall region. There are also two breakers 39 and 40 extending circumferentially around the interior of the tire and located directly inwardly of the tread portion 31. Conventional rubber compositions are used to form the tread and sidewall portions of the tire and the air-retaining inner liner.

Each of the plies 35 and 36 is formed of a single layer of ply fabric which is spliced together to form an annular shape. Each of the plies 35 and 36 is identically formed, and both will be described with reference to the ply 36. The splice is formed in the ply 36 with one end of the ply 41 overlapping the other end 42. One end 41 of the ply 36 is provided with a plurality of cuts 43 which extends transversely to the splice and in a circumferential direction with respect to the tire. The cuts 43 form a generally serrated edge in the end 41 of the ply at the splice.

It will be noted that in the finished tire, the cuts 43 in the overlapping end 41 of the ply 36 prevent the overlapping end from forming additional reinforcement, which would provide reduced tension in the radial plies in the area of the splice. This lack of reduced tensioning results in the substantial reduction or elimination of sidewall indentations which otherwise occur in the area in which the plies overlap to form a splice.

The invention as shown herein is applied to conventional radial tire construction; however, it is understood that the invention may be adapted for use with other standard designs of tires. While the invention has been shown and described with respect to specific embodiments thereof, these are intended for the purpose of illustration rather than limitation, and other modifications and variations will be apparent to those skilled in the art, all within the intended spirit and scope of the invention.

What is claimed is:
1. A method of making a radial ply pneumatic tire, which comprises the steps of:
(a) placing a layer of ply stock having parallel cords on a tire carcass with the sides of the ply layer extending outwardly to the area of bead placement and the parallel cords extending across the sides of the ply layer in a direction that becomes radial when the tire carcass is expanded into a toroidal shape;
(b) making a plurality of cuts in one end edge of the ply layer in a direction generally transverse to the parallel cords, thereby cutting the cords nearest the end edge into separate sections;

(c) overlapping the cut edge with the other edge of the ply layer to form an annular layer of ply stock on the carcass; and (d) completing the construction of the tire.

2. A method of making a radial ply pneumatic tire as defined in claim 1, wherein steps (a) through (c) are repeated for additional layers of ply stock.

3. A method of making a radial ply pneumatic tire as defined in claim 1, wherein the length of the cuts is approximately the same as the width of the overlap of the cut end with the other end.

4. A method of making a radial ply pneumatic tire as defined in claim 1, wherein said cuts are made substantially along the entire length of said end edge.

5. A method of making a radial ply pneumatic tire as defined in claim 1, wherein said cuts are made inwardly of the area of bead placement on each side of said ply layer.

6. A radial ply pneumatic tire which comprises:
a tread portion extending circumferentially around the tire;
two annular bead portions having beads embedded therein;
a pair of flexible sidewall portions along the sides of the tire, each sidewall portion connecting one side of said tread portion with the associated bead portion; and
a carcass ply having radial cords extending through sidewall portions, said ply folded around said beads so that the side portions of the plies are located in said sidewall portions, the end edges of said ply being overlapped and spliced together to form a generally annular shape, one end edge of said ply at the splice having a plurality of cuts extending transverely to the splice and dividing the radial cords nearest said end into separate sections.

7. A radial ply pneumatic tire as defined in claim 6 wherein the length of each of said cuts is approximately the same as the width of the overlap of the cut end edge with the other end edge.

8. A radial ply pneumatic tire as defined in claim 6, wherein said cuts are provided substantially along the entire length of said end edge.

* * * * *